Figure 1:
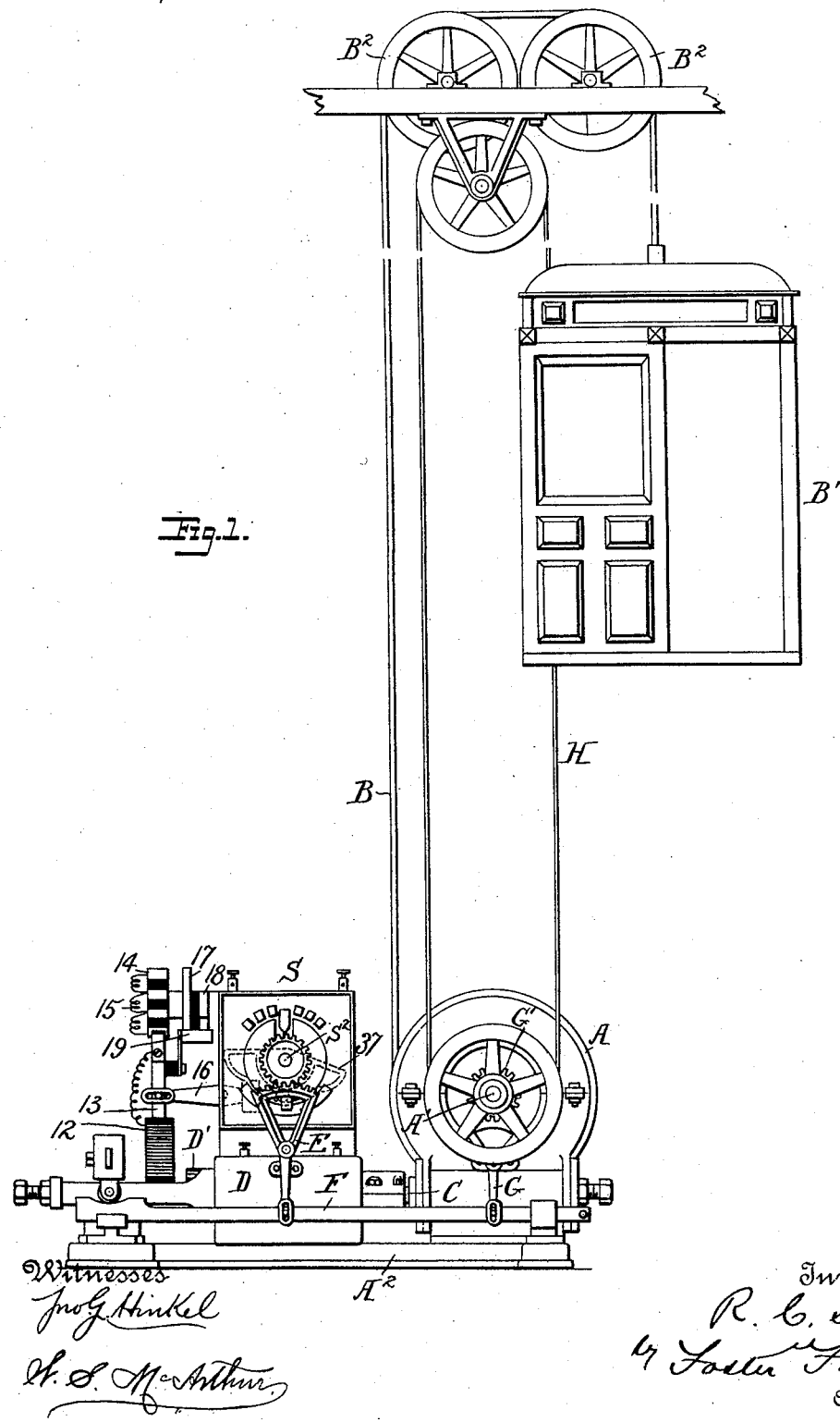

(No Model.) 3 Sheets—Sheet 1.

R. C. SMITH.
ELECTRIC ELEVATOR.

No. 468,903. Patented Feb. 16, 1892.

(No Model.) 3 Sheets—Sheet 3.
R. C. SMITH.
ELECTRIC ELEVATOR.

No. 468,903. Patented Feb. 16, 1892.

Witnesses
Jno. G. Hinkel
H. S. McArthur

Inventor
R. C. Smith
by Foster Freeman
Attorneys

UNITED STATES PATENT OFFICE.

RUDOLPH C. SMITH, OF YONKERS, NEW YORK, ASSIGNOR, BY MESNE ASSIGNMENTS, TO THE NATIONAL COMPANY, OF CHICAGO, ILLINOIS.

ELECTRIC ELEVATOR.

SPECIFICATION forming part of Letters Patent No. 468,903, dated February 16, 1892.

Application filed August 28, 1891. Serial No. 403,982. (No model.)

*To all whom it may concern:*

Be it known that I, RUDOLPH C. SMITH, a citizen of the United States, residing at Yonkers, Westchester county, State of New York, have invented certain new and useful Improvements in Electric Elevators, of which the following is a specification.

My invention relates to the general utilization of electricity in operating motors for the purpose of driving machinery of various classes, and more particularly to the use of electric motors for operating elevators.

It has for its object to overcome some of the difficulties or bad effects experienced in starting the motor with its load; and to these ends my invention consists in a construction and arrangement of parts, substantially as more particularly hereinafter set forth.

I have shown my invention as applied to an electric motor of a well-known type. It is well known that to start a motor connected to drive an elevator or other machinery from a state of rest requires an excessive amount of current—sometimes nearly double the quantity of current that is required to maintain the motor in operation after the elevator or machinery is in motion. When the current is turned on to start a motor under these conditions, the pressure in the main line drops to a greater or less extent, especially when the generator plant furnishing the current is of limited capacity and where the regulation of such generators is not of the very highest efficiency to compensate for such drop. When the motor used is what is known as a "shunt-wound motor," the drop of pressure weakens the field of the motor in such a way that the motor will not start with a full load on. In order to get the strongest pull or torque at the moment of starting with such a motor, it is necessary to have a strong field and many turns or coils on the armature, and for this reason I prefer to use a motor with a larger number of armature-coils than is necessary to operate the elevator or other machinery after it has started and is running at normal speed. I have found in some instances it is desirable to provide the armature with double the number of ampère turns that is necessary for the normal speed. In other words, I use an armature wound so as to be adapted to utilize a five-hundred-volt current in a motor otherwise adapted to utilize a two-hundred-and-fifty-volt current or any other relative arrangement of the armature-coils in excess of the normal arrangement. Such a motor would, with the same strength of field, run at about half the speed as if the regular and usual number of armature-turns were used, and it would also start the same load with about half the current. Furthermore, the starting of such a motor with its load will cause very little drop in the circuit of a plant having even a limited generator. After the motor is started with its load I weaken the strength of the field-magnet coils, so that the motor will run at its normal speed, the same as if the armature had the usual proportion of turns for the reduced strength of the field-circuit. This I accomplish automatically by different means, one being by throwing a resistance into the field-magnet circuit. Another way of accomplishing this object consists in the arrangement of the field-magnet coils at starting and when running under its normal load. Thus on starting the field-magnet coils may be arranged in parallel sections, and afterward when the motor has attained its speed these sections may be connected in series. This will enable the motor to start with a full field even at a greatly-reduced voltage, as the resistance of the field when normally running is greater than when the field is excited with the sections in parallel. This last arrangement, while it is not as advantageous in some respects as the first arrangement, still gives the full field strength of the shunt-motor when the voltage has fallen by the excessive current used in starting.

For the purpose of illustrating my invention I have shown it applied to a well-known type of electric elevators, which I have illustrated in the drawings.

Figure 2:
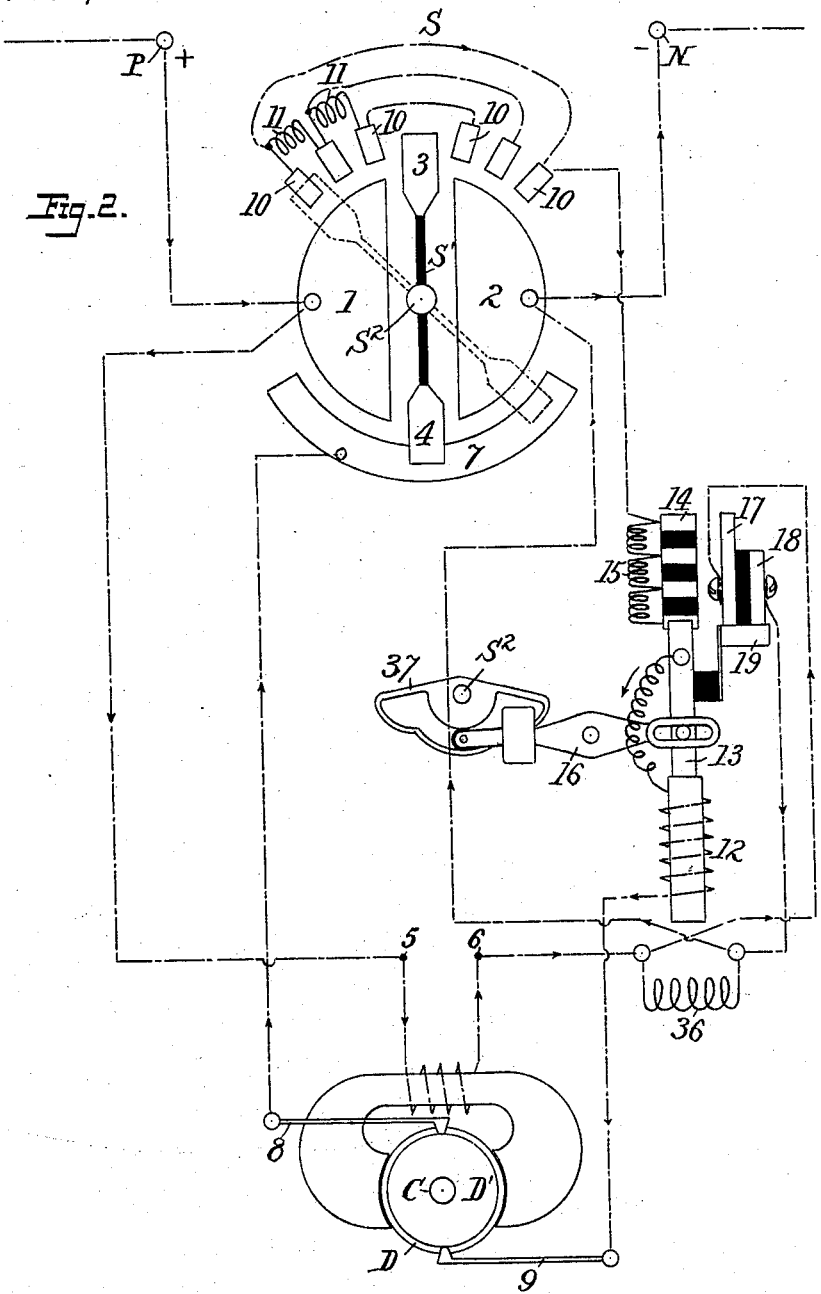
Figure 3:
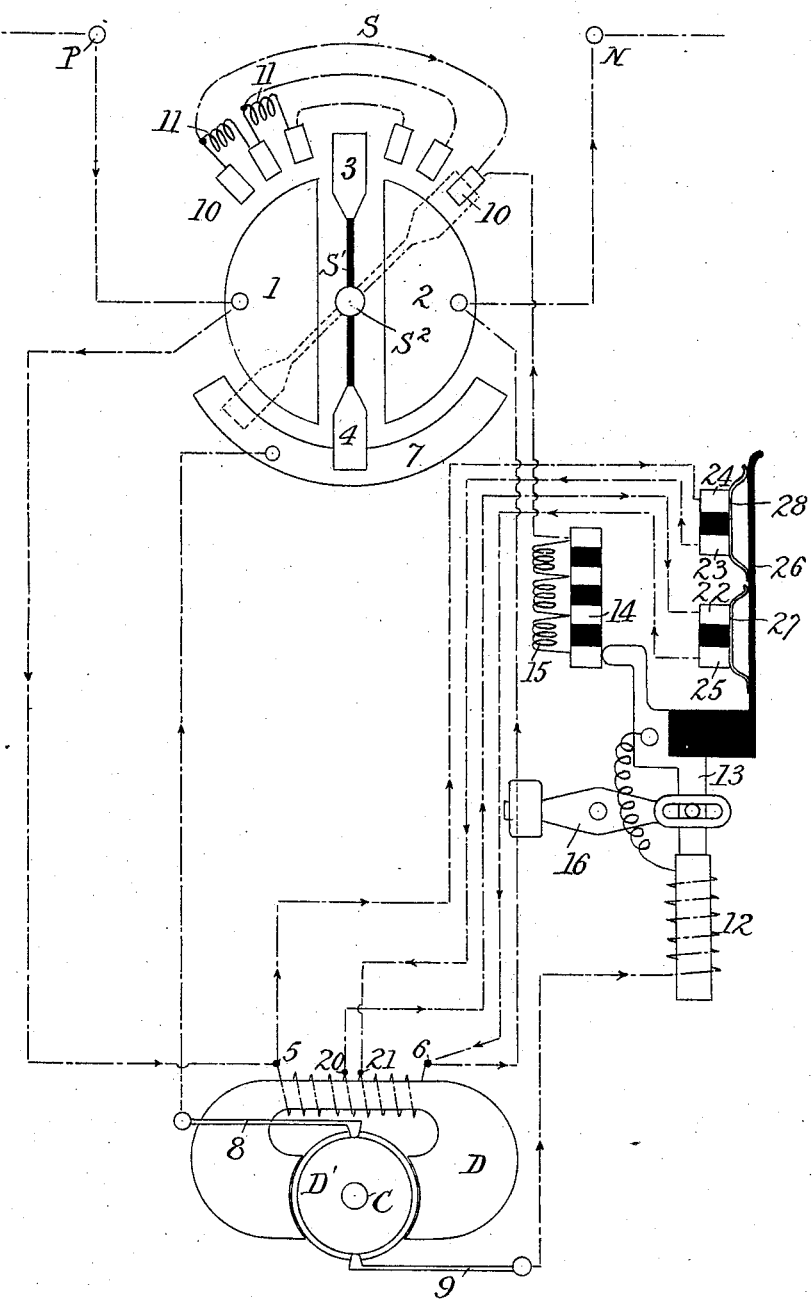

Figure 1 is a general plan view of the electric motor and its attachments and connections between the same and the elevator-cage. Fig. 2 is an enlarged diagrammatic view of the circuits of the motor, showing one embodiment of my invention; and Fig. 3 is a similar view showing another embodiment thereof.

It is not deemed necessary to describe in detail the operation of this machine, as it is well understood by those skilled in the art, it being sufficient to say that A is the winding-drum, upon which the rope B is wound and unwound to raise and lower the car B', the rope passing over suitable sheaves B². The drum A is supported upon a shaft A', which is mounted in suitable bearings on the base-plate A², and this drum is operated, for instance, by a worm-wheel on the shaft C, meshing with a suitable worm-gear on the shaft A'. This shaft C is driven by an electric motor D, the armature D' of which is fixed to the shaft C.

The current supplied to the electric motor, which motor may be of any desired type, but preferably a shunt-wound motor of the Eickemeyer type, is controlled by a suitable switch device S, whereby it may be started, stopped, reversed, and otherwise controlled in a manner more fully hereinafter set forth. This switch device S is shown as operated by a segmental lever-arm E, which in turn is connected to a sliding rod F, and this in turn is connected by a segmental arm G to a pinion G' on the shaft A', and this pinion is adapted to be operated from the car or other position by means of the hand-rope H, a lever, or other well-known mechanical or electrical device adapted for the purpose.

The switch device is arranged so that the current may be turned onto the motor in such a manner as to cause the armature of the motor to rotate in the desired direction, and to avoid the danger of injuring or burning the motor the current is first admitted to the field-coils to excite the field-magnet and is then gradually admitted to the armature-circuit until the whole current in the circuit is passing through the machine, resistance devices being connected to the switch to prevent the current passing with its full force directly to the armature. If, for instance, the armature should not turn under the current from any cause, as an overloading or otherwise, there is still liability of burning or injuring the armature-coils, and to guard against this a self-acting safety device is provided, by which a certain external resistance is included in the armature-circuit as long as the current which the armature would otherwise receive is beyond the normal or safety limit; but as the motor starts and the counter electro-motive force of the armature increases this external resistance is automatically reduced or removed from the armature-circuit, and when the motor is stopped this external resistance is automatically included in the armature-circuit and the current gradually turned off. Thus in the diagram the main-line circuit terminates at the binding-posts P N, and from these posts are conductors leading to the plates 1 2 of the switch S. The switch is provided with a switch-arm S', having insulated conductor-plates 3 4 at its ends, the arm being pivoted on a shaft S² and adapted to be moved by the connections between the shaft and the hand-rope or equivalent device. One of the plates 1 of the switch is connected to one terminal 5 of the field-coils of the motor D and the other plate 2 is connected to the other terminal 6 of the field-coils of the motor. The segmental plate 7 of the switch is connected to one of the brushes 8 of the armature of the motor and the other brush 9 is connected to one of a series of contact-plates 10 of the switch, which are connected together with interposed resistances 11 between the plates.

Interposed in the armature-circuit is a solenoid 12, the core 13 of which bears on a series of contact-plates 14, connected together by resistances 15, and its core is under the control of a weighted lever 16, which normally tends to draw the core from the solenoid, so that it will rest upon the upper plate 14. This weighted lever, however, is controlled by a cam 37, preferably on the shaft S² of the switch-lever, and this cam is so shaped that when the switch is in its normal position and the current cut out, and until the switch is turned to either side to contact with one of the extreme plates 10 the lever 16 is held in the position shown best in Fig. 2, with the core to its fullest extent within the coils of the solenoid. When the switch-lever is turned to the extreme position, the cam allows the lever 16 to move under the influence of the weight, if not otherwise controlled, so as to cause the core 13 to bear on the uppermost contact-plate 14, and thereby cut out of the armature-circuit the resistance 15. When, however, on turning the switch, and for some reason the motor does not start and too much current would flow through the armature-coils, the coils of the solenoid 12 are energized to such an extent as to hold its core in the position shown in Fig. 2, retaining the resistance 15 in the armature-circuit, and not until the motor starts and produces sufficient counter electro-motive force to offer a proper resistance to the circuit through the armature will the attractive force of the solenoid be reduced sufficiently to allow the weighted lever to move its core to withdraw the resistance 15 from its circuit. It will thus be seen that the cam will insure the resistance 15 being included in the circuit until the full current is turned onto the motor, and then if this current from any cause is too strong to safely pass through the coils of the armature the resistance 15 will be retained in the armature-circuit; but when the current through the armature is of proper strength the resistance will be automatically cut out by means of the weighted lever and the motor run under normal conditions as far as the armature is concerned.

In order to utilize the proper amount of current to the best advantage in starting the motor, I interpose in the field-magnet circuit a resistance or change the current through the coils of the field-magnet, as before indicated. To do the first I interpose in the field-magnet circuit a resistance device 36 and connect the terminals thereof to the contact-plates 17 18. I also attach, preferably to the core 13 of the solenoid, but insulated therefrom, a contact-brush 19, which normally short-circuits the plates 17 and 18, short-circuiting the resistance-coil 36 of the field-magnet circuit. When, however, the motor has started under normal conditions and the resistance of the armature is automatically cut out, the contact-plate 19 is carried upward by the solenoid core 13 until it passes beyond the contact 18, and this puts the resistance 36 into the field-magnet circuit and the motor runs with the proper field of force to operate the motor with its load.

In order to trace the circuits definitely, the parts will be assumed to be in the position indicated in full lines in Fig. 2. The switch-arm S' is gradually turned to the left, as indicated in dotted lines, and as soon as the contact-plate 3 passes onto the first plate 10 and completes the circuit between the plate 1 and one of the contact-plates 10 the armature-current passes through said contact-plate and the resistance 11 to the opposite contact-plate 10, and thence through the contact-plate 14 and resistances 15, the core 13, the solenoid 12 to the brush 9, through the coils of the armature to the brush 8, thence to the plate 7, and by the contact-plate 4 of the switch-arm to the plate 2, and out at the binding-post N. As the switch-arm S' moves farther the resistances 11 are gradually cut out of the armature-circuit and the cam 3 is rotated, so that its slot comes to a position to allow the weighted lever 16 to operate. If, however, the current is too strong the solenoid will hold its core in the position shown; but when the current becomes normal the solenoid-core is moved under the influence of the weight and the resistances 15 cut out and the short circuit of the resistance 36 of the field-magnet circuit is broken and the resistance thrown in the field-magnet circuit. From this arrangement it will be seen that not only can the motor be started under a heavy load, but that it can be run at different speed under varying loads. Thus when the motor is started under any conditions all the armature-resistances are in the circuit and the field-resistance is short-circuiting. When the motor has started and sufficient counter electromotive force is generated, the armature-resistance 15 is cut out, and if the load is light the field-resistance 36 is included in the circuit and the motor will run rapidly with its light load. If, however, the load is heavy and the current through the motor increases the solenoid will draw its core downward sufficiently to close the short circuit of the resistance 36, and this will reduce the amount of current through the motor, which will run more slowly and continue so unless the current gets excessive, when the resistances 15 will gradually be included in the armature-circuit.

In the modified arrangement shown in Fig. 3 the switch and armature circuits are the same as in Fig. 2; but the field-magnet coils are wound in sections, a loop being taken from the coils 20 21 and connected to the contact-plates 22 23, respectively, and the terminals of the field-magnet coils 5 and 6 are also respectively connected to the contact-plates 24 and 25. Attached to the solenoid-core 13 is an insulating-bar 26, carrying circuit-closers 27 28, and under the starting conditions the contact-closer 27 completes the circuit between the contact-plates 25 and 22 and the circuit-closer 28 completes the circuit between the contact-plates 23 and 24. Under these conditions the field-magnet circuit at the point 5 divides, a portion passing through part of the coils of the field-magnet out at the post 20, thence to the contact-plate 22 by the circuit-closer 27 to the contact-piece 25, and out at the binding-post 6, while the other portion of the current passes from the binding-post 5 to the contact 24, thence by the circuit-closer 28 to the contact 23 to the post 21, and through the remaining coils of the field-magnets and out at the post 6, thus putting two portions of the coils of the field-magnet in parallel. When, however, the motor has started and is running normally, the solenoid-core 13 rises under the influence of the weighted lever 16 and the circuit-closers move off their respective contacts and the circuit-closers 27 closes the circuit between the contacts 22 and 23, and under these conditions the current through the field-magnet enters at the post 5, passes through the portion of the coils to the posts 20, thence to the contact-plate 22, by the circuit-closer 27, to contact-plate 23, thence to the post 21, and through the remaining coils of the field-magnets to the post 6 and to line, putting the coils of the field-magnet in series, so that the motor will run properly under its load.

While I have thus described my invention and illustrated the preferred forms of embodying it, it will be understood by those skilled in the art that the details of construction and arrangements of parts may be varied without departing from the principles thereof, and I do not therefore limit myself to the exact constructions and arrangements illustrated.

What I claim is—

1. The combination, with an electric motor, of a reversing-switch, resistances operated by said switch, independent additional resistances in the armature-circuit, a contact-brush for said additional resistances, positively connected to the main switch during the first part of the travel of the switch but free to move when released, electrical devices controlling said contact-brush, means to move the contact-brush against the action of the current in said electrical device, and means to increase resistance in the field-magnet coils after all other resistances are cut out, substantially as described.

2. In an electrical elevator, the combination, with the electric engine, the cage operated thereby, a switch controlling the engine, and means for controlling the switch from the cage, of an independently-adjustable resistance in the armature-circuit connected to the switch, and means to include resistance in the field-magnet circuits, substantially as described.

3. In an electric motor, the combination, with an independent safety device in the armature-circuit, of means for increasing the resistance in the field-magnet coils of the motor, arranged to operate at the end of the operation of the safety-resistance device, substantially as described.

4. In an electric elevator, the combination, with an electric engine, the elevator-cage operated thereby, and a switch controlled from the cage, of a safety-resistance in the armature-circuit, connections between said safety-resistance and switch, and connections arranged to increase the resistance in the field-magnet coils at the end of the action of the safety-resistance, substantially as described.

5. In an electrical elevator, the combination, with an electric engine, a cage operated thereby, a switch controlling the engine, and means for operating the switch from the cage, of a safety-resistance in the armature-circuit connected to the switch, a solenoid controlling said resistance, and connections arranged to increase the resistance in the field-magnet coils after the other resistances are cut out, substantially as described.

6. The combination, with an electric motor, of a reversing-switch, resistances operated by said switch, independent additional safety-resistances in the armature-circuit, a contact-brush for said resistances, positively connected to the main switch during the first part of the travel of said switch, but free to move when released, a solenoid connected in the armature-circuit of the motor controlling said brush, and means to increase the resistance of the field-magnet coils after all other resistances are cut out, substantially as described.

7. In combination with an electric motor and a switch controlling the circuit through the field and armature coils thereof, a cam connected to the switch, a resistance normally in the armature-circuit, a solenoid also in the armature-circuit, a lever controlled by the cam connected to operate the core of the solenoid, and a brush carried by the solenoid and arranged to vary the resistance of the circuit through the field-magnet coils of the motor, substantially as described.

8. The combination, with the electric motor and a switch controlling the circuit through the field and armature coils thereof, of an independent safety device in the armature-circuit, a contact-brush for said device, connections between said contact-brush and the controlling-switch, a solenoid controlling said contact-brush, a resistance in the field-magnet circuit, and a contact-piece carried by the said contact-brush and arranged to include said resistance in the circuit of the field-magnet coils when the safety-resistance is cut out, substantially as described.

In testimony whereof I have signed my name to this specification in the presence of two subscribing witnesses.

RUDOLPH C. SMITH.

Witnesses:
F. L. FREEMAN,
BENJ. T. WELCH, Jr.